Figure 1:
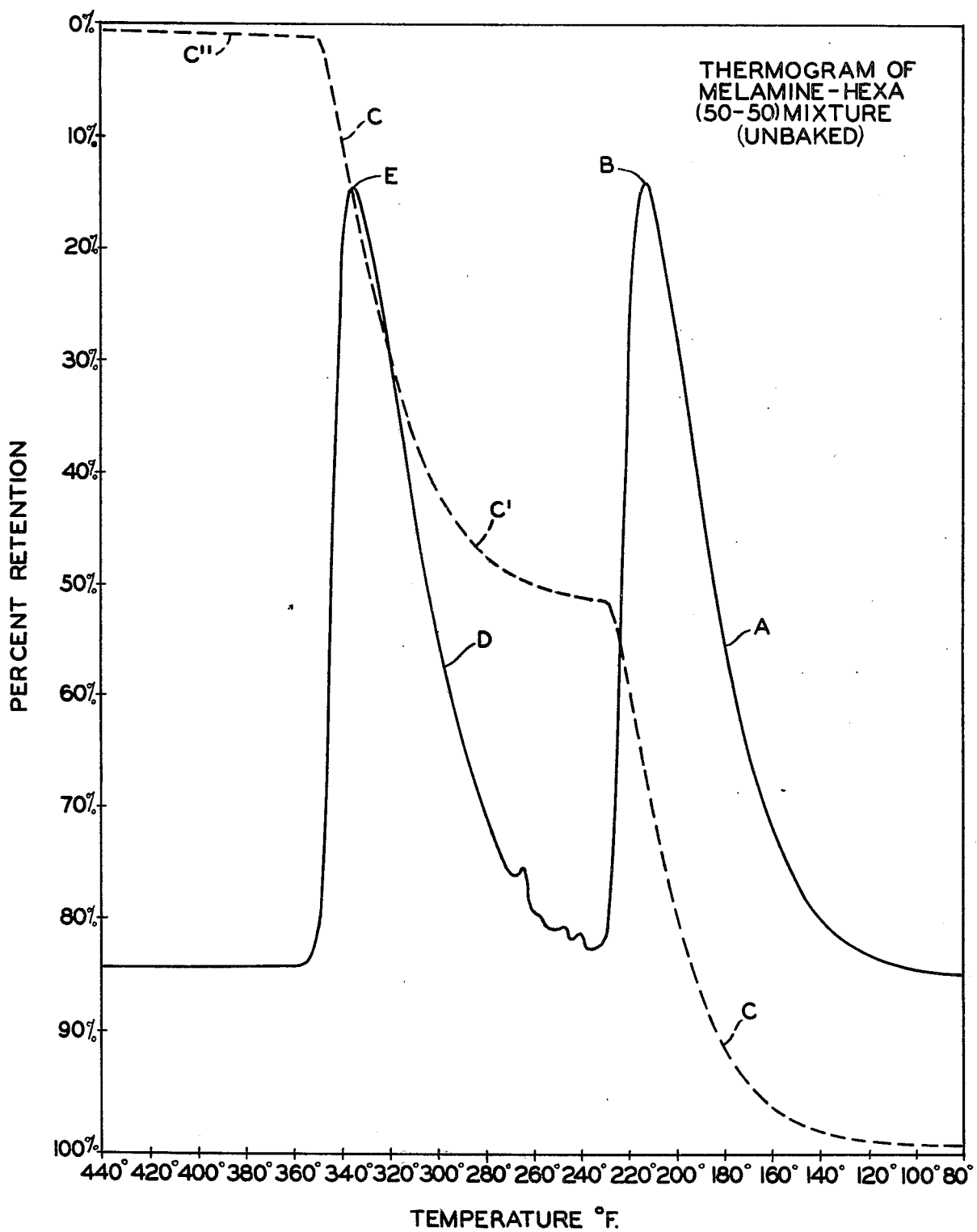

United States Patent [19]

Kellner

[11] 4,115,366

[45] Sep. 19, 1978

[54] PHENOLIC RESIN-MELAMINE COMPOSITION

[75] Inventor: Jerome C. Kellner, Sheboygan, Wis.

[73] Assignee: Plastics Engineering Company, Sheboygan, Wis.

[21] Appl. No.: 868,029

[22] Filed: Jan. 9, 1978

Related U.S. Application Data

[63] Continuation-in-part of Ser. No. 748,675, Dec. 8, 1976, abandoned.

[51] Int. Cl.² .................... C08G 14/10; C08G 14/12
[52] U.S. Cl. .................... 528/131; 260/17.2; 260/19 A; 260/19 N; 260/38; 528/132; 528/163
[58] Field of Search .................... 260/51.5, 59 R

[56] References Cited

U.S. PATENT DOCUMENTS

| 2,387,256 | 10/1945 | Groten | 260/59 X |
| 2,593,926 | 4/1952 | Simons | 260/51.5 X |
| 2,816,085 | 12/1957 | Anas et al. | 260/59 X |
| 3,321,551 | 5/1967 | Knutsson | 260/51.5 X |

OTHER PUBLICATIONS

Chem. Abstracts, vol. 70, 1969, 78785z, Matsuda et al.

*Primary Examiner*—Howard E. Schain
*Attorney, Agent, or Firm*—Walter J. Monacelli

[57] ABSTRACT

The phenolic molding compound described herein is improved in arc resistance, arc track voltage and flame or fire retardance by the presence of 10.5-20, preferably 11-16 percent by weight, of melamine based on the total composition. The fillers and modifiers used in such resin compositions are those normally used for molding purposes. Based on the starting Novolac used, the effective amount of melamine for these improvements is found to be 30-60 parts, preferably 32-50 parts by weight per 100 parts of Novolac resin. These amounts are found to have effective results for thicknesses as low as 0.020 inch.

8 Claims, 3 Drawing Figures

PHENOLIC RESIN-MELAMINE COMPOSITION

This application is a continuation-in-part of application Ser. No. 748,675 filed Dec. 8, 1976, now abandoned.

BACKGROUND OF THE INVENTION

1. Field of the Invention

This invention relates to phenolic molding compounds using phenol-aldehyde Novolac resins. More specifically, it relates to such resins modified to improve arc resistance, arc track voltage and flame retardance by the incorporation of melamine. Still more specifically, it relates to phenolic resin comprising 10.5–20 percent by weight of melmine based on the weight of the total composition.

2. State of the Prior Art

No prior art has been found for the use of melamine for improving the arc resistance or arc track voltage of phenolic molding compounds.

Moreover, while phenolic molding resins may be improved in flame or fire retardance by the addition of mineral modifiers, the use of sufficient amounts of mineral modifiers, such as hydrated alumina, to produce the desired flame retardant effect may have an adverse effect on other properties such as flow, cure rate and high specific gravity. Therefore it would be desirable to replace such mineral additives with melamine. However, when melamine has been used as one of the resin components such as in a phenol-melamine-aldehyde resin, the product has the normal post shrinkage for the resin.

French Pat. No. 1,480,362 shows the use of melamine in foam phenolic resins but makes no mention of its use in phenolic molding compounds. French Pat. No. 2,003,124 shows the use of a combination of a mineral or inorganic material having water of crystallization from which the water is released at high temperatures, together with an organic material, such as melamine.

In the parent application, the Examiner cited U.S. Pat. Nos. 2,387,256; 2,593,926 and 2,816,085; and Matsuda et al., Chem. Abstracts, Vol. 70, 1969, 7875z. In the final rejection, the Examiner relied only on the Groten U.S. Pat. No. 2,387,256 and the Matsuda et al. reference.

Groten, U.S. Pat. No. 2,387,256 shows the use of a melamine-formaldehyde resin instead of hexamethylenetetramine (hexa) as a curing agent for phenol-formaldehyde resins. As discussed later herein, the reaction of a preformed melamine-formaldehyde resin with a phenolic resin does not produce the same results as the reaction of the phenolic resin with a mixture of free melamine and hexamethylenetetramine.

The Matsuda Chem. Abstract reference describes briefly the production of a colorless resin solution by first reacting a Novolac resin with aqueous formaldehyde to form a methylolated product which is then reacted with melamine and aqueous formaldehyde for a sufficient period to produce a resin solution. This does not teach applicant's composition of a water-insoluble, solid Novolac resin mixed with unreacted melamine, and hexa which produces a molded product having a substantial amount of unreacted melamine therein.

SUMMARY OF THE INVENTION

In accordance with the present invention it has now been found that a number of properties, such as arc resistance, arc track voltage and flame or fire retardance, may be imparted to phenolic resin molding compositions merely by the addition of melamine after the resin formation and avoids the normal post shrinkage which occurs when the melamine is prereacted as a resin component. The desired improvements are evidenced with 30–60 parts, preferably 32–50 parts by weight of melamine per 100 parts of Novolac resin. With this amount of melamine the phenolic resin compositions are capable of achieving 180 seconds of arc resistance using the ASTM Arc Test D-495, the IEC Arc Track Test at 200 volts, and the Underwriters Laboratory Test 94V-O for a thickness of 0.020 inch.

As illustrated below in Example III, the presence of melamine not only improves the flame retardance of the phenolic resin but also effects significant improvement in arc resistance and in arc track voltage. As shown above, both of these properties are improved by the use of melamine as described herein. The molding composition generally has a number of fillers and modifiers to impart various desirable properties. Since some of the fillers or modifiers may be combustible, such as woodflour, cotton flock, etc., it may be desirable to minimize the amounts of such combustible materials used, or alternatively, to compensate for the presence of such materials by increasing the amount of melamine used.

Since the Underwriters Laboratory tests are most widely used in the fields in which products of the type described herein are marketed, most of the flammability test data accumulated in connection with this invention have been determined by the Underwriters Laboratory test method 94V-O for a 0.020 inch thickness. This test is entitled "Test for Flammability of Plastic Materials for Parts in Devices and Appliances" as published by Underwriters Laboratory, 1285 Walt Whitman Road, Melville, Long Island, N.Y. 1st Edition, September 1972, revised July 30, 1976.

As shown below, the use of melamine does enable thicknesses of 0.020 inch to pass this test.

Compositions of this invention are prepared by methods well known to those skilled in the art. The individual ingredients may be mixed together in a suitable vessel and then fed directly to the feed hopper of a screw extruder or roll mill. Alternatively, the melamine may be added to the resin prior to completion of its preparation or during the dehydration process.

The phenolic resin compositions of this invention can, and generally do, have additive components present which are normally used in such compositions in addition to the resin-melamine combination of this invention. Included among these other additives are the curing agent, such as hexa, fillers such as woodflour, asbestos, calcium carbonate, glass fibers, etc., and any combination of these or other known modifiers employed in phenolic molding compositions.

The first stage phenolic resins used in the practice of this invention may be any phenol-aldehyde resin which is prepared by reacting less than one mole of an aldehyde per mole of phenol under acidic conditions to a stage where the resultant resin is water-insoluble. An acid catalyst such as oxalic, hydrochloric, sulfuric, phosphoric or hydrobromic acid, $ZnCl_2$ or a sulfonic acid is used to promote the reaction. The resin so produced is commonly called a Novolac. This Novolac resin can generally be finely ground and requires blending thereof with a curing agent such as hexamethylenetetramine to produce a thermosettable resin which can be cured to an infusible state by exposure to elevated temperatures. While other aldehydes, such as paraformaldehyde, acetaldehyde, butyraldehyde, furfuraldehyde, etc. may also be used, formaldehyde is preferred.

A typical Novolac resin suitable for use in the practice of this invention may be prepared by using about 0.5–0.9, advantageously about 0.75–0.85 and preferably about 0.8 moles of formaldehyde per mole of phenol. The pH of this solution is adjusted with oxalic acid to a pH of 0.8–1.3 whereby the condensation proceeds exothermically. In a typical preparation the temperature is controlled while the reaction mass is allowed to reflux. When the exotherm has subsided, heat is applied and the mass refluxed for 2 hours. Then the mass is dehydrated until the batch temperature reaches 260° F. at which point a small amount of stearic acid may be added if desired, to serve eventually as a mold lubricant, and dehydration continued to a batch temperature of about 285° F. When the desired melting point is achieved, the resin is discharged into deep pans to cool, or in accordance with the present invention, melamine may be added and agitation continued 15–60 minutes before the resin is discharged. Such a resin will generally have a set time of 20–25 seconds, a tripod flow at 80° F. of 55–85 seconds, and a 60% solution viscosity flow at 25° C. of 250–1100 cst.

Generally the melting point of the dehydrated Novolac resin can vary, according to reactant ratios and reaction conditions, from 120° F. to 250° F., but is preferably in the range of 175° F. to 235° F. The setting time can vary from 10 to 60 seconds with 10% hexa at 330° F., but is preferably 15–35 seconds. The tripod flow may vary from 40 to 150 seconds with a preferred time being 60–80 seconds.

The dehydrated Novolac resin is pulverized and mixed with various modifiers and fillers, such as woodflour, asbestos, etc., puls hexa for subsequent molding operations. As much as 90% of the molding mixtures may comprise fillers and modifiers including the melamine, or at the other extreme, the mixture may consist entirely of the resin, curing agent such as hexa and melamine.

The various methods of mixing, such as mixing on differential rolls or in a screw extruder, the amounts of modifiers and methods of molding are advantageously similar to those used with present commercial phenolic molding compositions. The improvements effected by the presence of melamine are found to hold with a wide variety of Novolac resins and with the presence of the melamine, there is no detraction from or sacrifice of existent good physical or molding properties as shown by comparisons with the same compositions without the melamine.

In curing the resin-melamine-modifier mixtures, the temperature is advantageously between 280° F. and 420° F. (138°–216° C.), preferably 330°–380° F. (165°–195° C.). It is imperative that these critical temperatures should not be reached during the plasticizing operation so that premature curing is not effected. The plasticizing is preferably effected at about 230° F. (110° C.). In forcing the mixture into an injection mold, a pressure of 2,000 to 20,000 psi or more is applied, preferably about 4,000 to 10,000 psi.

The curing time depends on the thickness of the molded part, the temperature used, the amount of preheating, the pressure used, etc. Consequently, a typical curing time in an injection mold can range from 15 seconds for a small bottle cap to around 3 minutes for a rather large pot handle.

SPECIFIC EMBODIMENTS OF THE INVENTION

The invention is illustrated by the following examples which are intended merely for purpose of illustration and are not intended to be regarded as limiting the scope of the invention or the manner in which it may be practiced. Unless specifically indicated otherwise, parts and percentages are given by weight.

EXAMPLE I

A Novolac first stage resin is prepared in a large reactor equipped with a means of heating or cooling, agitator, refluxing means and means for removing samples. To the cleaned kettle the ingredients are added as specified on a weight basis per 100 pounds of phenol of:

49.25 — 52% formaldehyde aqueous solution
1.15 — Oxalic acid (slurried in 3 parts of water)

The phenol and formaldehyde are added in that order and the agitator turned on at high speed following which the oxalic acid is added mixed with hot water. A pH sample is taken and this should be 0.8–1.30. If above this value, it can be lowered by additional oxalic acid, followed by 5 minutes mixing and retesting. Then the temperature is allowed to rise to reflux temperature. As the temperature reaches reflux (212° F.), the temperature should be controlled to counteract the exotherm at this point. As the batch starts to reflux, the kettle is set for reflux at atmospheric pressure and the mixture is refluxed for 2 hours. At the end of the reflux period, the condenser is set for dehydration, and heat is applied to dehydrate the batch as rapidly as possible without overloading the condenser with vapors. After about 45 minutes of dehydration, a sample is removed for testing. If desired, stearic acid may be added as a mold lubricant (1.05 parts per 100 parts of phenol) when the batch temperature reaches about 260° F. When the temperature has reached 285° F., the steam is turned off and the agitator turned to slow speed. The properties of the product should be approximately as follows:

Melt Point — 185°–190° F.
Set time with 10% hexa at 330° F. — 20–25 sec.
Tripod Flow at 280° F. — 65–76 sec.
60% solution viscosity flow at 25° C. — 700–1100 cst.

This resin as well as others made with modifications in conditions of preparation may be used as the starting first stage resin for making various thermoset molding compositions of this invention. For example, the above procedure is repeated using individually, in place of the oxalic acid, an appropriate amount, respectively, of hydrochloric acid, sulfuric acid and ZnCl$_2$. In each case a resin is obtained suitable for the practice of this invention.

EXAMPLE II

A Novolac resin molding mixture is prepared having the following composition:

|  | Parts |
|---|---|
| Resin Ia (as described above) | 500 |
| Resin Ib* | 750 |
| Hexa (powdered) | 175 |
| Fir Woodflour | 350 |
| Asbestos | 1000 |

-continued

|  | Parts |
|---|---|
| Lime | 50 |
| Cotton Flock | 150 |
| Ca Stearate | 25 |
| Stearic Acid | 35 |
| Diatomaceous earth | 75 |
| Furfural | 25 |
| Nigrosine | 45 |
| Water | 50 |
| Melamine (pure) | 400 |

*-this resin is prepared as described in Example I and differs in properties only in having a melting point of 175-185° F.

The above ingredients are mixed on a rolling mill and molded at 165° C. to pieces having a thickness of 0.020 inch suitable for the UL 94V-O flammability test. When tested according to this procedure, the molded piece passed the test successfully

EXAMPLE III

The procedure of Example II is repeated a number of times using varying amounts of melamine. These amounts and the results of the various property tests are reported in the table below:

|  | 1 | 2 | 3 | 4 | 5 | 6 | 7 |
|---|---|---|---|---|---|---|---|
| % Melamine based on total formula | 7.3 | 8.0 | 10.0 | 11.0 | 14.0 | 16.7 | 22.0 |
| Parts Melamine per 100 parts of resin | 21 | 23 | 29 | 32 | 41 | 49 | 64 |
| 94 V-O/0.020 U.L.-Passed | NO | NO | NO | YES | YES | NO |  |
| Defect | Burn | Burn | Burn | 0 | 0 | 0 | Glow |
| ASTM Arc D-495 Sec. | 183 | 182 | 182 | 183 | 183 | 182 | 184 |
| IEC Arc Track Volts | 225 | 175 | 200 | 225 | 225 | 150 | 150 |
| Shrinkage in/in | 0.006 | — | — | 0.004 | 0.006 | 0.004 | 0.004 |
| Post Shrinkage 240 hr. 220° F | — | — | — | 0.0025 | 0.0035 | 0.004 | 0.004 |
| Specific Gravity | — | — | — | 1.59 | 1.56 | 1.55 | 1.55 |

EXAMPLE IV

The procedure of Examples I and II are repeated except that in place of the 1000 parts of asbestos there is substituted a combination of 550 parts of clay, which is a water-washed Georgia clay, and 300 parts of Wollastonite. The molded pieces likewise passed the flammability test UL94V-O.

In addition to the clays used in Example IV, various other mineral fillers may be substituted for the asbestos and various modifications may be made in the modifiers used.

In the prosecution of the parent application, the Examiner contended that applicant's use of an unreacted mixture of melamine and hexa with the Novolac resin was the same as Groten's mixture as shown in U.S. Pat. No. 2,387,256 in which the patentee mixes a phenol-formaldehyde resin with a preformed melamine-formaldehyde resin. As shown by the procedures described in Examples C and D, the melamine and formalin are reacted for substantial periods and dehydrated under vacuum to produce a solid resin product which is ground to a fine powder. Apparently because of the 3/1 and 5/1 mole ratios of formaldehyde to melamine used in making the resin, it apparently has sufficient reactivity left to act as a curing agent for the phenol-formaldehyde resin with which it is mixed for molding purposes.

The patentee recommends this as a curing agent to be used in place of hexamethylenetetramine, particularly because of the lower cost of this resin compared to that of the hexa. As a generalization, the patentee states in Col. 1 of page 3, lines 39-43, that in some cases hexa may be used in combination with this melamine-aldehyde resin as a curing agent. Nevertheless, the melamine has all been prereacted and is there only as a preformed resin. There is no free melamine present as in applicant's molding composition.

The Examiner contends that the melamine and hexa in applicant's composition would combine in the molding operation to form a resin component similar to that shown by Groten. However, it is applicant's contention that the conditions and time involved are not satisfactory to cause resinification of these components and that there is therefore a substantial amount of free melamine in the molded product to produce the flame retardant properties described.

In order to show the presence of free melamine in the molded product, applicant has had a number of tests performed on molded products with and without melamine in the molding compositions. These tests are described in the following Examples V and VI.

EXAMPLE V

Three samples were prepared for testing: (1) a 50—50 mixture of melamine and hexa; (2) a second 50—50 mixture of melamine and hexa sealed in an ampoule; and (3) hexa with no melamine. Sample (2) was heated in an oven at 130° C. for 16 hours. Each of the three samples is tested in Perkin-Elmer equipment designed for making thermogram tests. The amount of samples used were: (1) 62 mg; (2) 3.8 mg; and (3) 34.2 mg. In each case, the atmosphere used was oxygen; the flow rate was 40 ml/min., the weight suppression was 100; the recorder range was 10; the recorder mode was % sample; the filter was L; the program controller had a lower limit of 30° C. and upper limits of 900° C., 400° C. and 400° C., respectively; the heating rate was 20° C. per min., recorder pens 1 and 2 were set for 10 mv each; and the chart speed was 10mm/min.

Figure 2:
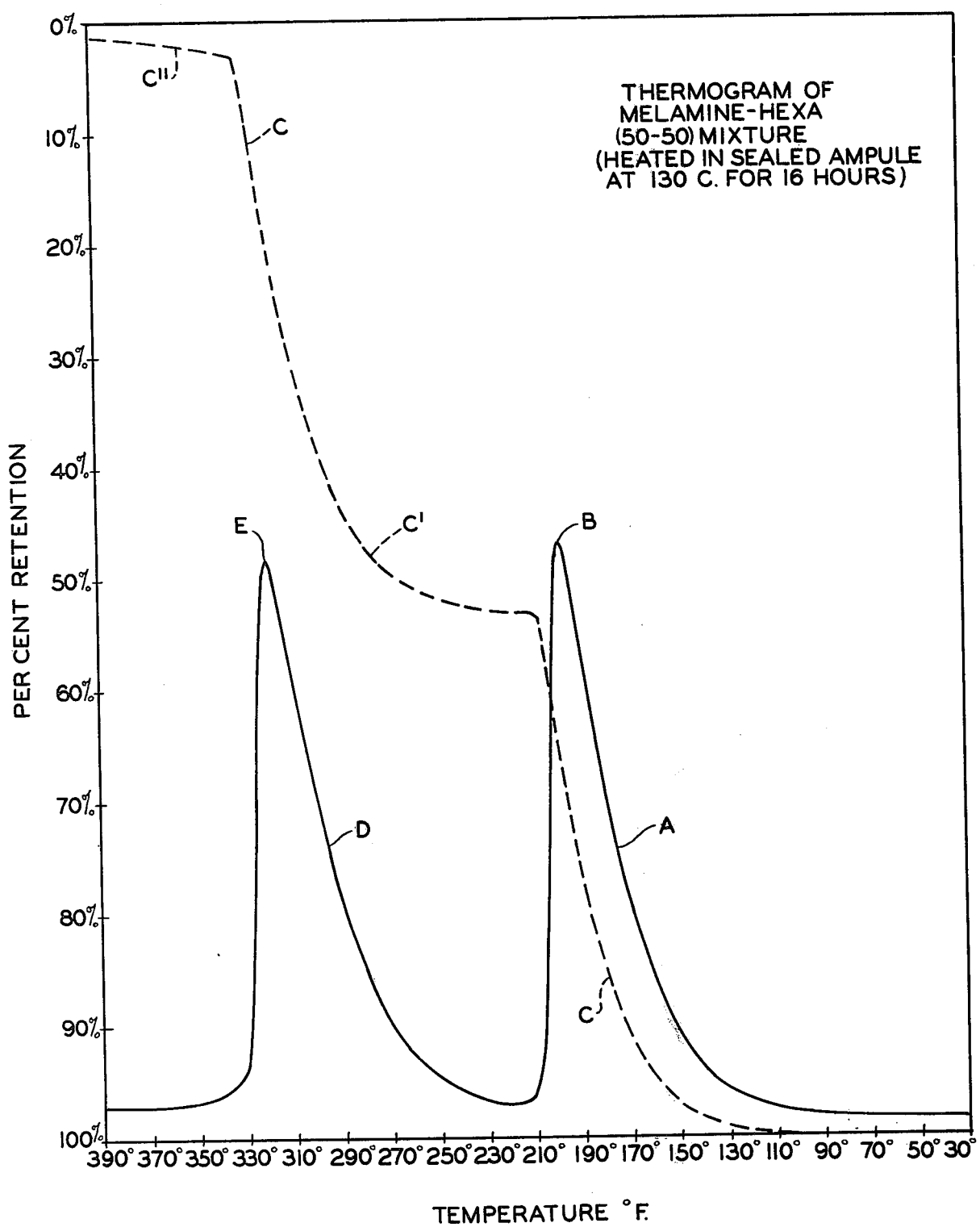
Figure 3:
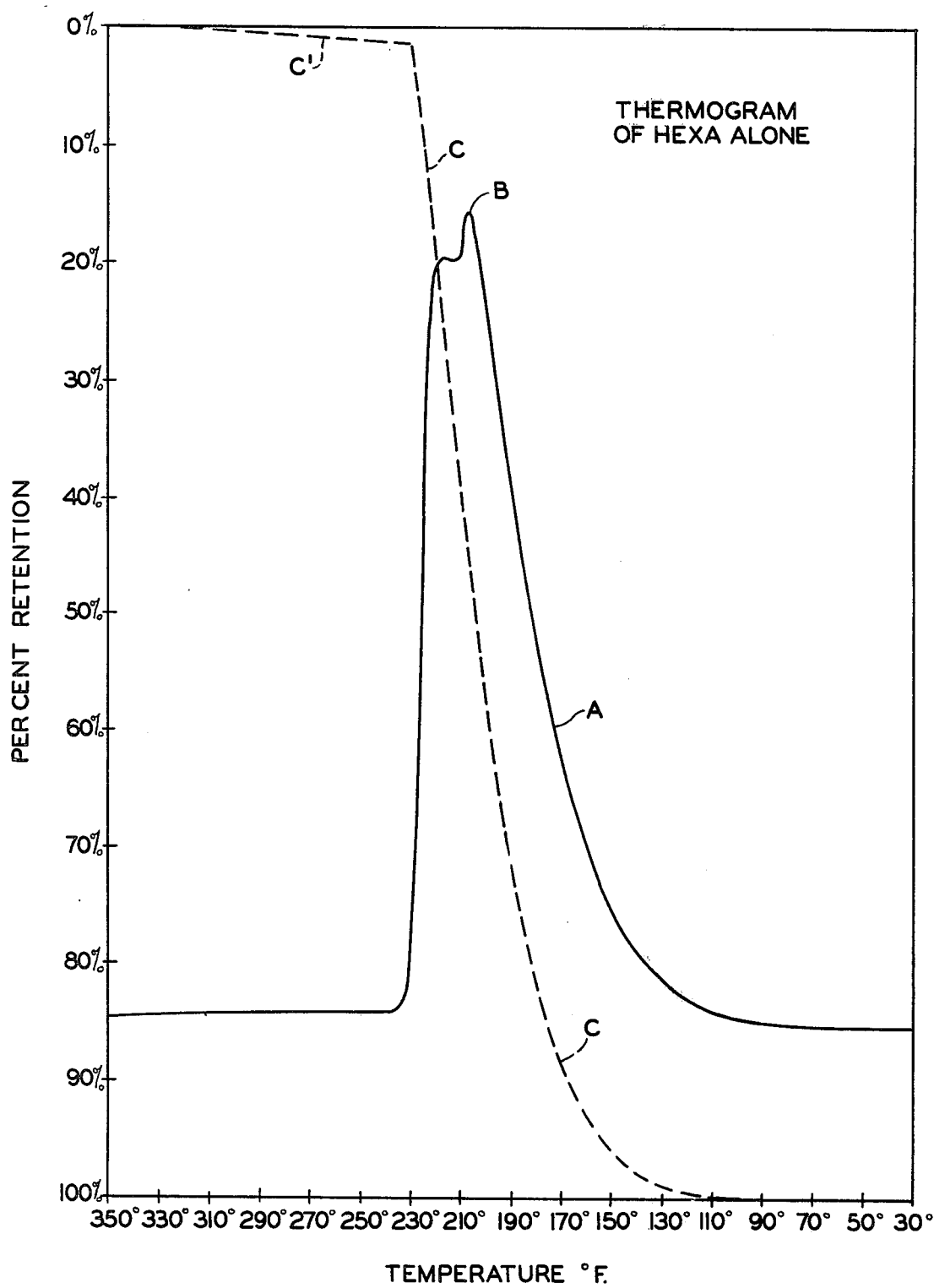

FIGS. 1, 2 and 3 of the drawings represent the respective thermogram charts with FIG. 1 representing the results with sample (1), FIG. 2 representing the results with sample (2); and FIG. 3 representing the results with sample (3).

In the respective curves, A and C are differential curves and C is the integral curve representing the percent weight of sample retained or remaining at any particle time or temperature interval. The differential curves for the mixtures of melamine has two peaks B and E. Peak B represents sublimation of hexa which is effected in the temperature range of 200°-220° F. Peak E represents sublimation of the melamine which is effected in the temperature range of 320°-340° F.

In FIGS. 1 and 2, the integral curve C represents the percent of the mixture which is retained or remains at any particular time or temperature, and the somewhat flattened portion C is near the 50% mark which indicates that substantially all of the hexa has been sublimed from the mixture. From the flattened portion C' to the top of curve C, the curve represents the portion of melamine still retained. The top flattening portion C" curve C represents substantially complete sublimation of the material or near 0% retention.

If there had been complete coreaction of the melamine and hexa there would be an integral curve with a flattening portion only at the top; this would indicate only one material present which would be the reaction product of the melamine and hexa and there would be only one peak in the differential curve. If there had been substantial, but incomplete reaction of the melamine and hexa, there would be three peaks for curve C, one each for hexa, melamine and the reaction product thereof. Moreover, there would also be three flattened portions in the integral curve C representing each of the three resulting components of the reaction mixture.

FIG. 3 shows curve A reaching peak B and representing sublimation of hexa with the peak positioned again in the range of 200°–220° F. It is also noted that integral curve C has only one flattened portion C' and that is at the top where the curve is approaching 0% retention. This is in contrast to the curves C of FIGS. 1 and 2 where the flattened portion C' represents substantial exhaustion of hexa at about 50% retention which corresponds to the 50% content of hexa in the starting mixture.

It is evident therefore that there has not been substantial reaction of the melamine with hexa during the heating at 130° F. for 16 hours.

To determine whether higher tempeature and longer heating might cause more reaction between the melamine and the hexa, (2) was repeated, setting the oven for 160° C. although the recorded temperature was 155° C. The heating was continued for 72 hours, but neither the high temperature nor the longer heating had any effect since the resulting thermogram was substantially identical to that of FIG. 2.

EXAMPLE VI

As further proof that there is a substantial amount of unreacted melamine in the molded products produced according to this invention, a number of tests were performed wherein samples of molded product were heat treated for varying periods and the losses in nitrogen content noted. Similar tests were also made on molded products in which no melamine was added. The resin and modifiers to be added were mixed on a two-roller mill with three variations. One batch was given a standard rolling for about 22 seconds, another batch for 15 seconds (short roll) and a third batch for 30 seconds (long roll). The first batch was transfer-molded into a number of bars having dimensions of $\frac{1}{2} \times \frac{1}{4} \times 5$ inches. The other two batches were put into a Brabender separately and advanced to a molded state and reverted back to a coarse powder of 10–100 mesh size (Tyler). For each batch at least 20 samples were used and five samples of each were removed at each heating stage for analysis so that the results could be averaged. The results of these various heat treatments are given below in Tables I, II, III and IV. The differences between the nitrogen in the theoretical content reported for the bars and that reported as initial content in the rolled material are apparently due to nitrogen lost during the grinding and rolling. The nitrogen contents in the samples from which melamine was omitted is due to ammonia which is believed to be trapped in the product from the decomposition of the hexa as well as a small percentage in the fir woodflour used as filler. The difference between the $N_2$ contents with and without melamine represents the $N_2$ present as melamine.

TABLE I

WITH MELAMINE (BAKED AT 350° F)

| | % $N_2$ at 0 hrs. | % $N_2$ at 31 hrs. | % $N_2$ at 100 hrs. | % $N_2$ at 500 hrs. | % $N_2$ at 1000 hrs. | Total % N Lost after 1000 hrs. |
|---|---|---|---|---|---|---|
| Powder (Short Roll) | 8.59 | 6.40 | 4.09 | — | 3.42 | 5.17 |
| Powder (Long Roll) | 8.40 | 6.20 | 4.10 | 3.14 | 3.17 | 5.23 |

WITHOUT MELAMINE (BAKED AT 350° F)

| | | | | | | |
|---|---|---|---|---|---|---|
| Solid Bar | 2.20* | — | 1.71 | 1.30 | 1.19 | 1.01** |
| Powder (Short Roll) | 1.60 | 0.75 | 0.75 | 0.80 | 0.78 | 0.82 |
| Power (Long Roll) | 1.55 | 0.81 | 0.59 | 0.72 | 0.85 | 0.70 |

*Theoretical % $N_2$
**Difference from theoretical % $N_2$

TABLE II

WITH MELAMINE (BAKED AT 400° F)

| | % $N_2$ at 0 hrs. | % $N_2$ at 31 hrs. | % $N_2$ at 100 1 hrs. | % $N_2$ at 500 hrs. | % $N_2$ at 1000 hrs. | Total % N Lost after 1000 hrs. |
|---|---|---|---|---|---|---|
| Solid Bar | 9.92* | — | — | 7.75 | 6.89 | 3.03** |
| Powder (Short Roll) | 8.59 | 5.33 | 4.09 | 3.32 | 3.16 | 5.43 |
| Power (Long Roll) | 8.40 | 3.80 | 4.10 | 3.22 | 3.20 | 5.20 |

WITHOUT MELAMINE (BAKED AT 400° F)

| | | | | | | |
|---|---|---|---|---|---|---|
| Solid Bar | 2.20 | — | 1.35 | 1.17 | 1.28 | 0.92** |
| Power (Short Roll) | 1.50 | 0.75 | 0.90 | 0.90 | 1.09 | 0.51 |
| Power (Long Roll) | 1.55 | 0.84 | 0.78 | 1.06 | 1.24 | 0.31 |

*Theoretical % $N_2$
**Difference from theoretical % $N_2$

TABLE III

Differences in % N2 After 1000 Hrs. Heating

| | Temp. | % $N_2$ Lost After 1000 Hrs. With Melamine | % $N_2$ Lost After 1000 Hrs. Without Melamine | Difference or % $N_2$ lost as Melamine |
|---|---|---|---|---|
| Solid Bar | 350° F | 1.41 | 1.01** | 0.40 |
| Solid Bar | 400° F | 3.03 | 0.92** | 2.11 |
| Powder (short roll) | 350° F | 5.17 | 0.82 | 4.35 |
| Powder (short roll) | 400° F | 5.43 | 0.51 | 4.92 |
| Powder (long roll) | 350° F | 5.23 | 0.70 | 4.53 |
| Powder (long roll) | 400° F | 5.20 | 0.31 | 4.89 |

**Difference from theoretical

TABLE IV

Difference in % Weight Loss After 1000 Hrs. Heating

| | Temp. | With Melamine | Without Melamine | Difference or % Loss Due to Melamine |
|---|---|---|---|---|
| Short Roll | 350° F | 25.46 | 18.60 | 6.86 |
| Long roll | 350° F | 25.44 | 18.03 | 6.41 |
| Short roll | 400° F | 38.29 | 32.19 | 6.10 |
| Long Roll | 400° F | 38.38 | 32.79 | 5.59 |

Since there was about 12% melamine in the original molding composition, and the above figures show an average weight loss of about 6.24%, this means that about 5% of the melamine is still trapped in the resin minus the amount that might have been lost during milling and grinding. It is believed that with greater surface area exposed, that is, with smaller particle size, the amount of melamine removed by the baking would be even greater.

From the data in the above tables it is apparent that there is a substantial amount of unreacted melamine in the molded products.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A thermosettable molding composition comprising:
   (a) a water-insoluble phenol-aldehyde resin consisting essentially of an acid-catalyzed phenol-aldehyde resin having 0.5–0.9 moles of aldehyde per mole of phenol reacted to a water-insoluble stage;
   (b) 10–33 parts of hexamethylenetetramine per 100 parts of said phenol-aldehyde resin; and
   (c) 30–60 parts by weight of melamine per 100 parts by weight of said phenol-aldehyde resin.

2. The molding composition of claim 1 in which said aldehyde is formaldehyde.

3. The molding composition of claim 2 in which said composition contains 32–50 parts of melamine per 100 parts of said resin.

4. The molding composition of claim 3 in which said formaldehyde is reacted in a ratio of 0.75–0.85 mole per mole of said phenol.

5. A thermoset resin of improved arc resistance, arc track voltage resistance and flame retardance comprising the composition of claim 2 cured at a temperature of 138°–216° C.

6. A thermoset resin of improved arc resistance, arc track voltage resistance and flame retardance comprising the composition of claim 2 cured at a temperature of 165°–195° C.

7. A thermoset resin of improved arc resistance, arc track voltge resistance and flame retardance comprising the composition of claim 3 cured at a temperature of 138°–216° C.

8. A thermoset resin of improved arc resistance, arc track voltage resistance and flame retardance comprising the composition of claim 4 cured at a temperature of 138°–216° C.

* * * * *